(12) United States Patent
Muralimanohar et al.

(10) Patent No.: US 11,126,549 B2
(45) Date of Patent: Sep. 21, 2021

(54) PROCESSING IN-MEMORY ARCHITECTURES FOR PERFORMING LOGICAL OPERATIONS

(71) Applicant: Hewlett Packard Enterprise Development LP, Houston, TX (US)

(72) Inventors: Naveen Muralimanohar, Palo Alto, CA (US); Ali Shafiee Ardestani, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 48 days.

(21) Appl. No.: 16/073,202

(22) PCT Filed: Mar. 31, 2016

(86) PCT No.: PCT/US2016/025143
§ 371 (c)(1),
(2) Date: Jul. 26, 2018

(87) PCT Pub. No.: WO2017/171769
PCT Pub. Date: Oct. 5, 2017

(65) Prior Publication Data
US 2019/0042411 A1    Feb. 7, 2019

(51) Int. Cl.
*G06F 7/57* (2006.01)
*G06F 12/0802* (2016.01)
(Continued)

(52) U.S. Cl.
CPC ............ *G06F 12/0802* (2013.01); *G06F 7/57* (2013.01); *G06F 15/7821* (2013.01);
(Continued)

(58) Field of Classification Search
CPC .................. G06F 12/0802; G06F 17/16; G06F 2212/1024; G06F 15/7821; G06F 7/57;
(Continued)

(56) References Cited

U.S. PATENT DOCUMENTS

| 6,023,759 A | 2/2000 | Omtzigt |
| 9,110,778 B2 | 8/2015 | Fleischer et al. |

(Continued)

FOREIGN PATENT DOCUMENTS

| CN | 1581061 A | 2/2005 |
| CN | 104011658 A | 8/2014 |
| CN | 107615241 A | 1/2018 |

OTHER PUBLICATIONS

Coates et al., "Deep learning with COTS HPC systems", Proceedings of the 30th International Conference on Machine Learning, JMLR: W&CP vol. 28, 2003, 9 pages.

(Continued)

*Primary Examiner* — Tasnima Matin
(74) *Attorney, Agent, or Firm* — Sheppard Mullin Richter & Hampton LLP

(57) ABSTRACT

In an example, a method includes identifying, using at least one processor, data portions of a plurality of distinct data objects stored in at least one memory which are to be processed using the same logical operation. The method may further include identifying a representation of an operand stored in at least one memory, the operand being to provide the logical operation and providing a logical engine with the operand. The data portions may be stored in a plurality of input data buffers, wherein each of the input data buffers comprises a data portion of a different data object. The logical operation may be carried out on each of the data portions using the logical engine, and the outputs for each data portion may be stored in a plurality of output data buffers, wherein each of the outputs comprising data derived from a different data object.

20 Claims, 3 Drawing Sheets

(51) Int. Cl.
*G06F 15/78* (2006.01)
*G06N 3/063* (2006.01)
*G06N 3/04* (2006.01)
*G06F 17/16* (2006.01)
*G06N 3/08* (2006.01)

(52) U.S. Cl.
CPC ............ *G06F 17/16* (2013.01); *G06N 3/0454* (2013.01); *G06N 3/063* (2013.01); *G06N 3/08* (2013.01); *G06F 2212/1024* (2013.01); *Y02D 10/00* (2018.01)

(58) Field of Classification Search
CPC ........ G06N 3/08; G06N 3/063; G06N 3/0454; Y02D 10/13; Y02D 10/12
See application file for complete search history.

(56) References Cited

U.S. PATENT DOCUMENTS

| | | | |
|---|---|---|---|
| 9,158,344 | B2 | 10/2015 | Pyeon et al. |
| 2010/0312997 | A1* | 12/2010 | Walker ................ G06F 15/7842 712/221 |
| 2014/0040532 | A1 | 2/2014 | Watanabe et al. |
| 2014/0172937 | A1 | 6/2014 | Linderman et al. |
| 2015/0242308 | A1 | 8/2015 | Kim et al. |
| 2016/0049195 | A1 | 2/2016 | Yu et al. |

OTHER PUBLICATIONS

Le et al., "Building High-level Features Using Large Scale Unsupervised Learning", Proceedings of the 29th International Conference on Machine Learning, 2012, 8 pages.

Farmahini-Farahani et. al., "Drama: An Architecture for Accelerated Processing Near, Computer Architecture Letters", Http://ieeexplore.ieee.org/stamp/stamp.jsp?arnumber=6846276, Jun. 30, 2014, vol. 14, pp. 26-29.

International Search Report & Written Opinion received in PCT Application No. PCT/US2016/025143, dated Dec. 14, 2016, 15 pages.

Li Hai et al: "Emerging memristor technology enabled next generation cortical processor". 2014 27th IEEE International System-On-Chip Conference (SOCC). IEEE. Sep. 2, 2014. pp. 377-382. XP032677710. DOI: 10.1109/SOCC.2014.6948958 [retrieved on Nov. 5, 2014] * p. 377-p. 380*.

Taha, T. M. et al., "Exploring the Design Space of Specialized Multicore Neural Processors," 2013, IEEE, https://ieeexplore.ieee.org/document/6707074/.

Xu, L. et al., "Scaling Deep Learning on Multiple In-Memory Processors." Dec. 8, 2015. pp. 1-7, https://www.eecis.udel.edu/~lxu/resources/Scaling%20Deep%20Learning%20on%20Multiple%20In-Memory%20Processors.pdf.

Morad, A. et al. "Efficient Dense and Sparse Matrix Multiplication on GP-SIMD" Oct. 1, 2014, pp. 1-8 https://ieeexplore.ieee.org/stamp/stamp.jsp?tp=&arnumber=6951895&tag=1.

* cited by examiner

PROCESSING IN-MEMORY ARCHITECTURES FOR PERFORMING LOGICAL OPERATIONS

BACKGROUND

Architectures for processing apparatus which allow Processing In-Memory (PIM) have been described. In PIM, instead of retrieving data for processing from a remote memory, the processing is carried out locally to the memory.

BRIEF DESCRIPTION OF DRAWINGS

Non-limiting examples will now be described with reference to the accompanying drawings, in which.

DETAILED DESCRIPTION

Figure 1:
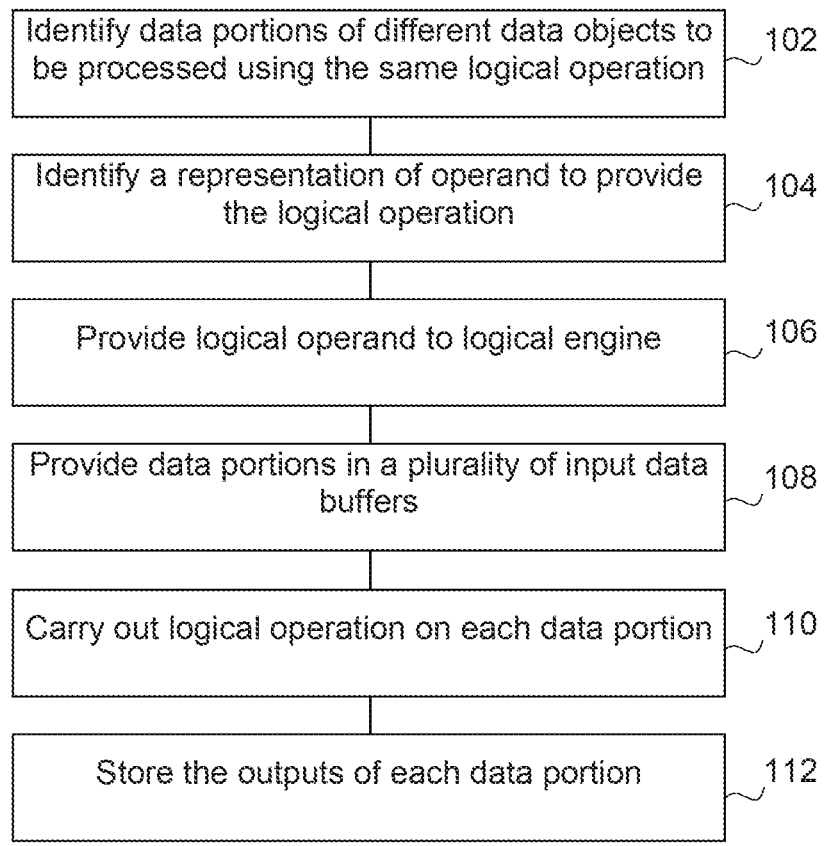
FIG. 1 is a flowchart of an example of a method of carrying out logical operations.

FIG. 1 shows an example of a method. In block 102, the method comprises identifying, in a plurality of distinct data objects stored in a memory, data portions of different data objects to be processed using the same logical operation. For example the data objects may be associated with at least one image, and the operation may comprise a stage in object recognition. For example, particular logical operations, such as convolutions, may be used to carry out tasks such as object recognition, for example face detection. It may be that the data objects comprise a set of image pixels, or for example a set of feature maps derived from a set of image pixels and the operation comprises a stage in face detection. Such inputs may be termed 'input neurons'. The data objects may be entirely unrelated (for example, comprising or derived from images from diverse sources).

Identifying the data portions may comprise determining, for example, based on at least one of the plurality of data objects and/or data portions, data outputs, and memory resources (which may be buffers or the like for receiving data portions, and/or memories storing operands, data objects, and/or data portions), a size of a data portion. Identifying the data portions may comprise determining an order for the data portions, for example such that the data portions may be interleaved. As further discussed below, the order, size and number of data portions may be determined in order to provide a substantially continuous supply of data for processing either using the same operand, or a plurality of operands.

Block 104 comprises identifying, in the memory, a representation of an operand to provide the logical operation, and, in block 106, a logical engine is provided with the operand (which may for example comprise a matrix). The logical engine may be a vector-matrix multiplication engine. In some examples, the logical engine may be provided as resistive memory array. In some examples, the logical engine may comprise an arithmetic-logic unit (ALU).

In block 108, the data portions are stored in a plurality of input data buffers. Each of the input data buffers comprises a data portion of a different data object. This may comprise storing the data portions according to an intended processing order, i.e. the order in which the data portions are to be subjected to logical operations. Block 110 comprises carrying out the logical operation on each of the data portions. This may comprise carrying out a matrix-vector multiplication or the like. In example in which the data portions are associated with an order, the order may be determined such that utilisation of the logical engine carrying out the logical operation is high, in some examples substantially continuous (i.e. a processing pipeline is at least substantially full, and in some examples as full as is practical). Block 112 comprises storing the outputs of each data portion, wherein each output comprises data derived from a different data object. In some examples, the outputs may be stored in a plurality of output data buffers, wherein each of the output data buffers comprises data derived from a different data object.

The method may be carried out using apparatus with a Processing In Memory (PIM) architecture. In such architectures, computational processing apparatus is placed within or near memory (for example, within a memory array or subarray) to avoid long communication paths.

In some examples, such as when using resistive memory devices such as "memristors" (which are electrical components which are capable of being written with a resistance in a non-volatile manner), the memory itself can provide a processing component. Arrays of resistive memory devices may be used for carrying out logical operations.

In some examples, the logical engine may be associated with Dynamic Random Access Memory (DRAM). In examples, this association may comprise a physical proximity and/or the integration of the logical engine with a component (for example, on a chip or die) which also comprises DRAM. In some examples, both the logical engine and the DRAM may be provided on the same die. In some examples, the logical engine may be associated with (for example, physically arranged adjacent to) a DRAM buffer, or may be provided as (or as part of) a Load-Reduction Dual Inline Memory Module (LRDIMM) buffer on a Dual Inline Memory Module (DIMM) which may also comprise at least one DRAM chip. In another example, a logic layer may be provided a part of a die which also comprises a memory portion, for example a DRAM portion. For example, the memory may be provided on one side of a die and the logical engine may be provided on another side of a die.

Some computational tasks use 'deep learning' techniques. In employing deep learning processing techniques, a logical operation is carried out on input data to provide an output in a first layer of processing. Logical operations are then carried out on the output in a subsequent layer of processing, in some examples for a plurality of iterations. Deep learning may be used in fields such as big data analysis, image and speech recognition and other computationally complex tasks. At least some of the processing layers may comprise convolutions, for example applying logical operations to input data using matrix multiplications. The convolution operand (e.g. a matrix) may be referred to as a processing kernel.

In order to accelerate deep learning workloads, acceleration of the convolution of data may in particular be considered as this can account for up to or around 80% of the execution time for some deep learning applications.

In some examples, the number of kernels held in storage may be large. For example, while a shared kernel may be used for a number, or for all, of a set of input data portions derived from a data object (which may be referred to as input neurons), in other examples, different input neurons from the same data object are processed using different kernels. In some examples, each input neuron derived from a data object may be associated with a different, 'private' kernel. For example, private kernels for some applications may take up more than a gigabyte of memory space.

In examples in which input neurons are each associated with a private kernel, the temporal locality (i.e. the data which can be held locally as it will be repeatedly processed) may be low, which may affect the utility of technologies such as caching.

To consider a particular example, face detection may be applied for example to a video file. In a processing layer, a number, $N_i$, of data objects may be provided. In an example, these may be $N_i$ images within a video file, and $N_x \times N_y$ data portions (input neurons such as pixels or feature maps) derived from $N_i$ images within the video file may be convolved with kernel of size $K_x \times K_y$ to form $N_o$ output feature maps. Each output entry in this case has its own kernel (i.e. kernels are private) and may be calculated based on the following equation:

$$\text{map}(x,y)^{out} = \Sigma_{i=0}^{N_i} \Sigma_{s=0}^{K_x} \Sigma_{t=0}^{K_y} w_{i,out,x,y}(s,t) \times \text{map}(x+s, y+t)^i$$

Where map and w denote feature maps entries and weights in a convolution layer, respectively.

Based on the above equation, such a layer takes up:

$$N_x \times N_y \times N_i \times N_o \times K_x \times K_y$$

of kernel space, which could readily exceed 1 GB in real life applications. In addition, since kernels are private, there is no temporal locality (no reuse of locally cached data), which imposes high bandwidth pressure.

According to the method of FIG. 1, data portions of different data objects (such as different images, or different feature maps) to be processed using the same logical operation are identified and stored in data buffers. This allows for batch processing, i.e. each of the data portions (which may be derived from different data objects) may be processed with the same kernel. In this way, the frequency with which new kernels are to be retrieved is reduced, as the kernel is reused. For example, the same kernel may be used to apply the same convolution to a corresponding input neuron (e.g. pixel or feature map) for each of a plurality of images before the kernel is changed. This provide temporal locality with respect to the kernel, even in examples where there is no or low temporal locality in respect of the data objects or data portions.

The data portions may be retrieved and provided to the data buffers in order such that a plurality of data portions are stored in the data buffers, and the logical operations using a particular operand may be carried out on the data portions substantially continuously. In other words, the data portions may be retrieved such that a substantially continuous pipeline of data to be processed by the logical engine may be provided. In some examples, the data objects may be associated with varying latencies, for example it may take longer to retrieve some data objects than others, which may depend on the memory type, location or the like. The memory resources for different data objects or data portions may differ in size. The batching of the data may take such discrepancies into account, such that any gaps in the pipeline which may for example result from the supply of data portions if data portions were requested in order and 'just in time' for processing, may be reduced by requesting the data early and holding it in a local buffer.

Figure 2:
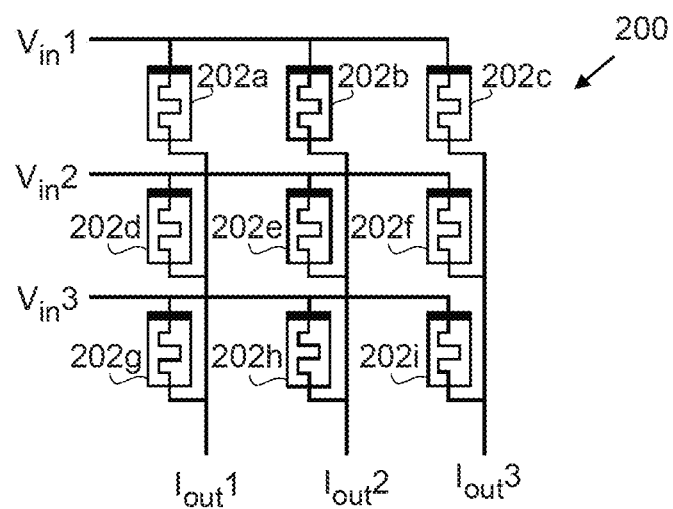
FIG. 2 is a simplified schematic of an example resistive memory array apparatus.

As noted above, in some examples, in PIM architectures, processing capability may be provided in close proximity, or embedded in, the memory. In some examples, memory may itself provide a logical engine such as a vector-matrix multiplication engine. In one example, a kernel may be embodied as a resistive memory array comprising a two-dimensional grid of resistive memory elements, which may be a crossbar array. An example of a crossbar array 200 of resistive memory elements 202 (for example, memristors or other resistive memory elements) is shown in FIG. 2. This resistive memory array 200 comprises at least one input row to receive input data and each resistive memory element has a bit depth. In this example, the term 'bit depth' is the number of bits that can be represented by a single resistive memory element 202. In some examples, the elements 202 may be a binary bit having one of two values for example, representing 0 or 1 (a bit depth of one bit), however resistive memory elements which can take a plurality of values, for example 32 distinct levels (a bit depth of five bits) have been demonstrated. The array 200 can be 'programmed' by submitting the elements to voltage pulses, each voltage pulse incrementally changing the resistance of that element 202, and the resistance level is then 'remembered' by the elements 202 as a resistance level, even after a power supply is removed.

In some examples, such an array 200 can process an input voltage vector (which may for example be provided using a Digital to Analogue Converter ADC to convert digital data bits to an analogue voltage value) to provide an output vector in which the input values are weighted by the conductance at each element 202 of the array 200. This effectively means that the array 200 performs a dot product matrix operation on the input to produce an output. The weights of the elements 202 can be individually 'programmed' by subjecting the elements 202 to voltage pulses as outlined above. Such arrays 200 may be associated with high density, low power consumption, long cycling endurance and/or fast switching speeds. Such an array may therefore carry out matrix combination operations. In some examples, the array may comprise part of a dot product engine for use in multiplying matrices together. Such dot product engines may be used in deep learning apparatus and to perform complex computational operations.

In an example, analogue data may be supplied for processing using a resistive memory array 200. The data may for example represent at least one pixel of an image, or a word (or sub-word or phrase) of speech, or results of a scientific experiment, or any other data. The input data may be provided as a vector, i.e. a one dimensional data string, and applied the array as a voltage value (generally a voltage lower than that used to set the resistance of an array element 202, such that the resistance of the element 202 is not changed in this operation).

If such a resistive memory array 200 is used, block 106 of FIG. 1 may comprises writing a resistive memory array with resistive values.

Figure 3:
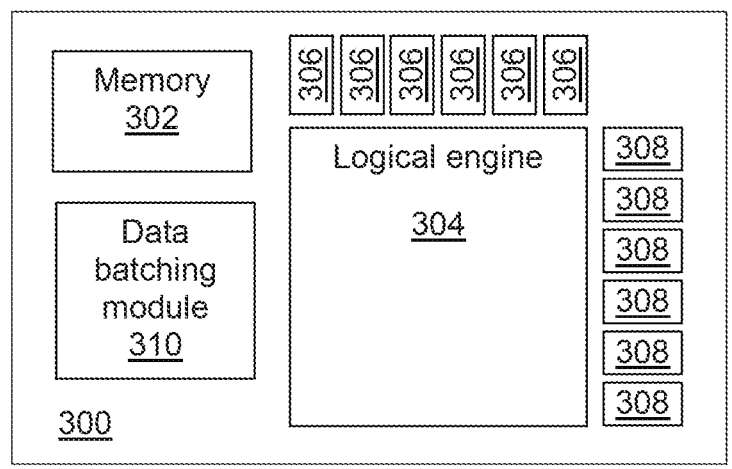
FIGS. 3 and 4 are schematic examples of a processing apparatus.

FIG. 3 shows an example of a processing apparatus 300 comprising a memory 302, a logical engine 304, a plurality of input buffers 306, a plurality of output buffers 308, the buffers 306, 308 being associated with the logical engine 304 (and in some examples, local thereto), and a data batching module 310.

The memory 302 comprises at least one memory portion and holds a plurality of distinct data objects and a plurality of logical operators, wherein the logical operators are for operating on data portions of the data objects.

The memory 302 may comprise at least one memory portion, some of which may be remote memory portions. In examples in which a plurality of memory portions are provided, the memory portions may comprise a plurality of different memory types and/or sizes. The memory 302 may comprise at least one non-volatile memory portion and/or at least one volatile memory portion such as SRAM or DRAM. In some examples, at least the plurality of logical operators are stored in a memory portion which is relatively local to the logical engine 304. In some examples, the logical engine 304 may be embedded in memory storing the plurality of logical operators. In other example, the logical engine 304 may be connected to memory storing the plurality of logical operators via a data bus having a relatively high bandwidth, such as a Through Silicon Via (TSV).

In examples, through the provision of buffers 306, 306 and the actions of the batching module 310, the specification of the capabilities of the memory 302 may be separated from capabilities of the logical engine 304, for example such that the logical engine 304 may be designed according to computational efficiency, while the memory 302 may be designed for storage capabilities. For example, the memory 302 may comprise, for a least a portion thereof, NMOS-based memory (which may be relatively dense and slow). In other examples, the memory 302 and/or the buffers 306, 308 may be implemented bearing in mind a trade-off between speed and density.

The logical engine 304 carries out logical operations on at least one data portion and in some examples on a plurality of data portions. The logical engine 304 could be provided by any processor. In some examples, the logical engine 304 may comprise a Field Programmable Gate Array (FPGA), a Application-Specific Integrated Circuit (ASIC), Single instruction, multiple data (SIMD) processing elements, or the like, which may provide a component of a Convolutional Neural Network (CNN) or a Deep Neural Network (DNN). In some examples, the logical engine 304 may comprise a resistive memory array.

In use of the apparatus 300, the data batching module 310 identifies, within a plurality of distinct data objects, data portions thereof to be operated on by a common operand (each data portion comprising all or part of data objects), and sends the data portions of a plurality of distinct data objects to the input data buffers 306. The logical engine 304 carries out a logical operation using the common operand on each of the data portions consecutively (and in some examples, at least substantially continuously), and provides an output from each operation to one of the plurality of output buffers 308.

In some examples, the data batching module 310 may be arranged to determine, based on at least one of the number of input data sets, output sets, and various memory resources (for example the buffers 306, 308, or at least one portions of the memory 302), a size of a data portion to be stored in a buffer 306. The data batching module 310 may be arranged to determine interleaving of data portions, for example in order to ensure that the utilisation of the kernel embodied by the operand is high (for example, such that the logical engine 304 is, for the period over which a particular kernel is being used thereby, substantially constantly performing logical operations).

As noted above, by using a common operand (which represents a common operand or kernel) for the plurality of data objects, temporal locality of the kernel data is achieved.

In some examples, the processing apparatus 300 may have a PIM architecture, with the operand being stored locally to the logical engine 304. By adopting a PIM architecture, off-chip bandwidth for fetching kernels may be avoided with corresponding power and time savings. However, this may mean that on-chip memory banks which may be used to store kernels occupy a relatively large area and transporting the kernels to the processor will still consume power, which could result in significant energy consumption.

Figure 4:
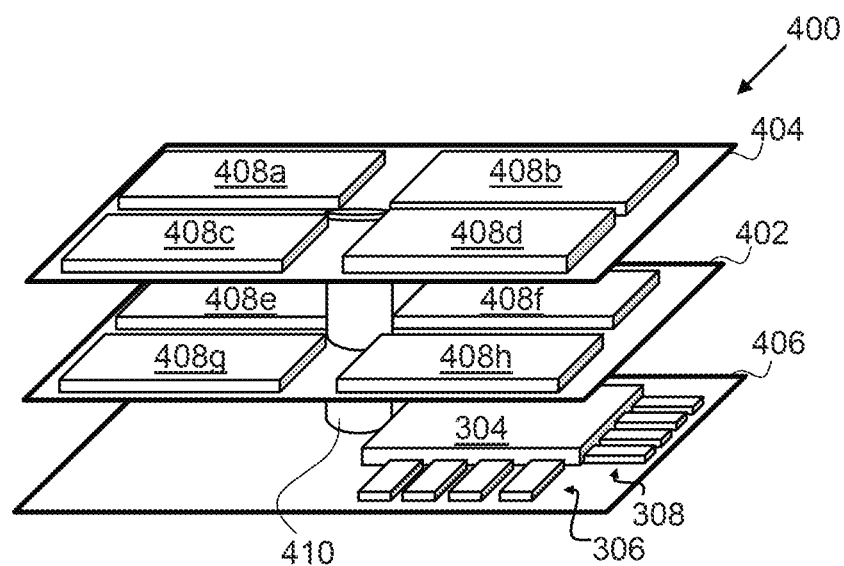

FIG. 4 shows an example of processing apparatus comprising a 3D memory stack 400. The stack 400 comprises a plurality of memory dies 402, 404 and at least one processing die 406. Each of the memory dies 402 comprise at least one memory portion 408a-h. These memory portions 408 may be similar (for example, the same memory type and/or size) or may differ in at least one of type, size or the like. In this example, the logical engine 304 is provided next (i.e. in close physical proximity to) a TSV 410 which connects the logical engine 304 to a first memory die 402. The physical proximity may be such that there is no wire routing between the TSV 410 and the logical engine.

In this example, the first memory die 402 stores the plurality of logical operators. In some examples, at least a portion 408 of the memory used to store the logical operators, the data objects and/or data portions comprises on-chip memory, and the logical engine 304 is an on-chip processing element. In some examples, a plurality of logical operators may be distributed over multiple memory dies 402, 404. In this example, one TSV 410 is illustrated. However, in other examples, multiple TSVs 410 may be provided, for example being associated with different dies, or one die may have multiple TSVs 410 to interconnect it with a processing die 406. In this example, the processing die 406 also comprises a plurality of input and output buffers 306, 308. The processing die 406 may also comprise a data batching module 310, or this may be provided elsewhere in the apparatus.

In other examples, the logical engine 304 could be provided on the same die as the memory storing the plurality of logical operators, although this may increase the footprint of an apparatus 400.

In some examples, data objects may also be stored on a memory die 402, 404, although the data objects may also be stored in remote memory portions and at least portions of data objects may be received from such remote memory portions. As noted above, the data objects may be stored in a plurality of different memory resources, which may have different sizes and may supply data with varying latency (which may be associated with at least one of the time to retrieve data from that particular memory resource and the time to transfer data to the processing die 406).

In some examples, the latency associated with providing logical operators to a logical engine is considered. Even though the logical operators may be retrieved relatively quickly, such an apparatus 400 is not without latency, which may result in (or increase) gaps or 'bubbles' in a processing pipeline and hence reduce performance. For example, accessing a row in 3D memory with 128-bit TSV bus may be associated around 16 ns of memory latency. Where there is no temporal locality, one row (for example, around 1 KB for 3D memory) of a matrix operator can be computed in 16 ns in such apparatus. As a result, in such an example, computation per 3D TSV is restricted to processing 1 KB of matrix operator in 16 ns (sixteen cycles if the logical engine 304 was provided in an example 1 GHz processing apparatus) per TSV bus. However, if the data was available, logical engine 304 could process it in 1 ns (1 cycle in 1 GHz). In other words, the computation efficiency of digital unit drops to $\frac{1}{16}$th since matrix operator memory latency is sixteen times higher that computation latency.

In some examples, therefore, providing a plurality of input and output buffers 306, 308 allows for compensation of this memory latency, such that the apparatus can operate a full computational speed without any 'bubbles' in the pipeline. In some examples, the number of buffers 306, 308 may be chosen to fully compensate for the difference. For example, the number of buffers 306, 308 may be determined using the cycle latency, which relates the memory latency to the computational latency. In the above examples, the cycle latency is sixteen, and thus there may be sixteen input buffers 306 and sixteen output buffers 308, and the same matrix operation may be performed 16 times (assuming sufficient data portions to which the operation is to be applied exist).

Such an apparatus 400 may utilise on-chip 3D capacity to store kernels (for example as matrix operators) which may be private kernels, and which may be used of computationally intensive operations such as in convolution of data for deep learning applications. By storing the kernels on a separate die (or dies) to the logic engine 304, this may free up space (for example, for more computation logic) on a processing die 406 (which in some examples may be a relatively expensive component). It may also be noted that the footprint of kernel memory space on the processing die 406 is just the space occupied by the TSV(s) 410. Providing the memory on a separate die 402, 404 to the logical engine 304 may also reduce the footprint of the stack 400. Furthermore, the apparatus 400 leverages batching to achieve high computation efficiency.

3D memory stacks may have a high capacity, for example, having 4 GB of memory space over 4 dies. Such a 3D memory may be able to store logical operators (e.g. deep learning kernels) for more than one convolution layer of one or a plurality of multilayer processing applications. This may enable a rapid context switch between different convolution layers on demand.

Figure 5:
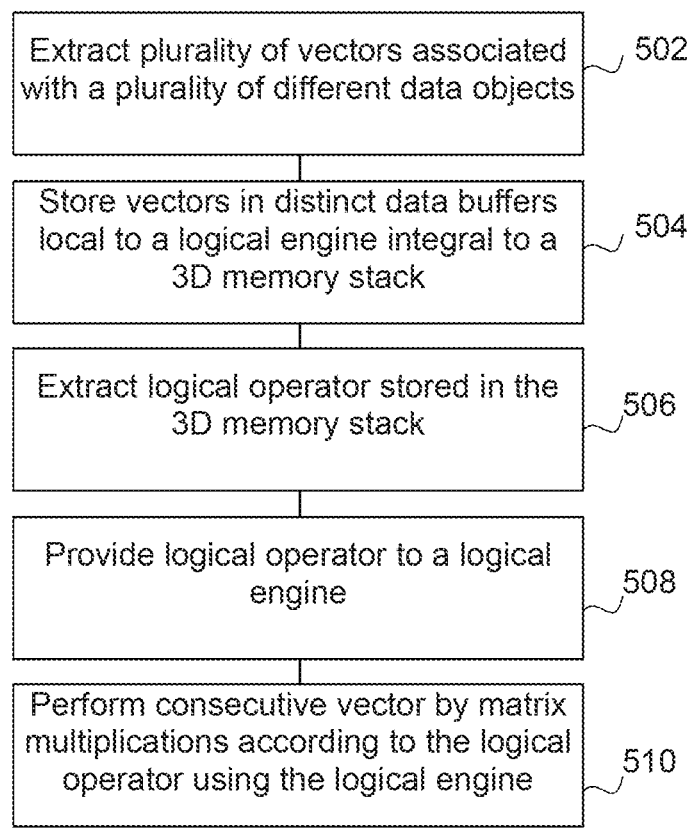
FIG. 5 is a flowchart of another example of another method for carrying out logical operations.

FIG. 5 is a flow chart of an example of a method comprising, in block 502, extracting a plurality of vectors associated with a plurality of different data objects. The plurality of vectors may comprise, or be derived from, a data portion of a data object as outlined above. In some examples, the vectors are derived from image feature maps, or from other data. The vectors may comprise a string of digital data, and may be retrieved from a local memory (for example from memory within a 3D memory stack also providing a logical operation), or from a different, for example more remote, memory. In block 504, the plurality of vectors are stored in distinct data buffers local to a logical engine integral to a 3D memory stack. Block 506 comprises extracting a logical operator stored in the 3D memory stack, which, in block 508, is provided to the logical engine.

In block 510, a plurality of consecutive vector by matrix multiplications are performed according to the logical operator using the logical engine, wherein the same logical operator is multiplied with each of plurality of vectors associated with a plurality of different data object. In some examples, such as those using resistive memory arrays, the vectors may undergo digital to analogue conversion to provide a representation of the vector as analogue voltage values. In some examples, a distinct output vector is provided for each of the data objects. For example such vector outputs may be held in distinct data buffers or registers.

The method may be carried out repeatedly, in some examples comprising providing the logical engine with a new logical operator for each iteration.

Examples in the present disclosure can be provided as methods, systems or machine readable instructions, such as any combination of software, hardware, firmware or the like. Such machine readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams (for example, the functions of the processing apparatus 300, 400). In particular, a processor or processing apparatus may execute the machine readable instructions. Thus functional modules of the apparatus and devices (such as the batching module 310 or the logical engine 304) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage (for example, the memory 302) that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
    identifying, using at least one processor, data portions from a plurality of distinct data objects stored in at least one memory to be processed using a common logical operation,
    identifying, using at least one processor, a representation of an operand stored in at least one memory, the operand being used to provide the common logical operation;
    providing a logical engine with the operand;
    storing the data portions in a plurality of input data buffers, wherein each of the input data buffers comprises a data portion of a different data object stored according to an intended processing order by which each of the data portions are to be subjected to the common logical operation;
    carrying out the common logical operation on each of the data portions using the logical engine; and
    storing the outputs for each data portion, each of the outputs comprising data derived from a different data object.

2. A method according to claim 1 in which carrying out the common logical operation comprises performing a vector by matrix multiplication.

3. A method according to claim 1 comprising determining a cycle latency of the memory storing the operand, and wherein identifying data portions comprises identifying a number of data portions based on the value of the cycle latency of the memory storing the operand.

4. A method according to claim 1 in which the data objects are stored in memory portions associated with different data retrieval latency, the method comprising:
    retrieving the data portions such that a plurality of data portions are stored in the data buffers, and
    wherein carrying out the common logical operation on the data portions using the logical engine is performed substantially continuously.

5. A method according to claim 1 in which providing a logical engine with the operand comprises writing a resistive memory array with resistive values.

6. A processing apparatus comprising:
    a memory comprising at least one memory portion, the memory being to hold at least one of a plurality of distinct data objects and a plurality of logical operators, wherein the logical operators are for operating on data portions of the data objects;
    a logical engine, to carry out a logical operation on at least one data portion;
    a plurality of input buffers and a plurality of output buffers associated with the logical engine,
    a data batching module, to identify, within a plurality of distinct data objects, data portions thereof to be operated on by a common logical operator, and to send the data portions to the plurality of input data buffers for storage according to an intended processing order by which each of the data portions are to be operated on by the common logical operator; and
    wherein the logical engine is further to carry out a logical operation using the common logical operator on each of the data portions in the plurality of input data buffers consecutively, and to provide an output from each operation to one of the plurality of output buffers.

7. A processing apparatus according to claim 6 in which at least one memory portion and the logical engine are provided on dies of a 3D memory stack.

8. A processing apparatus according to claim 7 in which the logical engine is provided on a first die and the memory is provided on at least one further die, wherein the dies are interconnected by a through silicon via.

9. A processing apparatus according to claim 7 in which the memory comprises a plurality of memory portions, and at least one memory portion comprises a memory size or type which differs from at least one other memory portion.

10. A processing apparatus according to claim 6 in which at least a portion of the memory is on-chip memory, and the logical engine is an on-chip processing element.

11. A processing apparatus according to claim 6 wherein the data batching module is to provide a number of data portions to the plurality of input data buffers which is less than or equal to a value of a cycle latency associated with the memory storing the operand.

12. A processing apparatus according to claim 6 which is to perform machine learning applications.

13. A method comprising:
    extracting a plurality of vectors associated with a plurality of different data objects from at least one memory;
    storing the plurality of vectors in distinct data buffers local to a logical engine integral to a 3D memory stack;
    extracting a logical operator stored in the 3D memory stack and providing the logical operator to the logical engine;
    performing a plurality of consecutive vector by matrix multiplications according to the logical operator using the logical engine, wherein the same logical operator is multiplied with each of plurality of vectors associated with a plurality of different data objects, and wherein the plurality of consecutive vector by matrix multiplications are performed following an intended processing order commensurate with an order in which the plurality of vectors are stored in the distinct data buffers.

14. A method according to claim 13, further comprising providing the logical engine with a new logical operator.

15. A method according to claim 13 in which the vectors are image feature maps.

16. A method according to claim 1 in which carrying out the common logical operation comprises performing a convolution.

17. A method according to claim 1 in which the at least one memory provides the at least one processor.

18. A method according to claim 17 in which the at least one processor comprises an array of resistive memory devices.

19. A method according to claim 1, further comprising determining the intended processing order such that utilization of the logical engine when carrying out the common logical operation is substantially continuous.

20. A processing apparatus according to claim 6, wherein the intended processing order is determined such that the logical engine carries out the logical operation using the common logical operator on each of the data portions in a substantially continuous manner.

* * * * *